US007370358B2

(12) United States Patent
Ghanea-Hercock

(10) Patent No.: US 7,370,358 B2
(45) Date of Patent: May 6, 2008

(54) AGENT-BASED INTRUSION DETECTION SYSTEM

(75) Inventor: Robert A Ghanea-Hercock, Ipswich (GB)

(73) Assignee: British Telecommunications public limited company, London (GB)

( * ) Notice: Subject to any disclaimer, the term of this patent is extended or adjusted under 35 U.S.C. 154(b) by 698 days.

(21) Appl. No.: 10/488,943

(22) PCT Filed: Sep. 10, 2002

(86) PCT No.: PCT/GB02/04107

§ 371 (c)(1),
(2), (4) Date: Mar. 9, 2004

(87) PCT Pub. No.: WO03/029934

PCT Pub. Date: Apr. 10, 2003

(65) Prior Publication Data

US 2004/0255157 A1    Dec. 16, 2004

(30) Foreign Application Priority Data

Sep. 28, 2001  (EP)  ................................. 01308321
Sep. 28, 2001  (EP)  ................................. 01308322
Sep. 28, 2001  (EP)  ................................. 01308325
Sep. 28, 2001  (EP)  ................................. 01308337

(51) Int. Cl.
*G06F 11/30* (2006.01)
*G06F 12/14* (2006.01)

(52) U.S. Cl. ........................................................ 726/23
(58) Field of Classification Search .................. 726/23, 726/22, 24, 25
See application file for complete search history.

(56) References Cited

U.S. PATENT DOCUMENTS 5,621,889 A * 4/1997 Lermuzeaux et al. ......... 726/22

6,393,386 B1 * 5/2002 Zager et al. .................... 703/25
6,684,329 B1 * 1/2004 Epstein et al. ................ 713/150
7,131,142 B1 * 10/2006 Kay ................................ 726/23

FOREIGN PATENT DOCUMENTS

| EP | 0 985 995 | 3/2000 |
|---|---|---|
| WO | WO 99/57625 | 11/1999 |
| WO | WO 00/38034 | 6/2000 |
| WO | WO 00/54458 | 9/2000 |
| WO | WO 00/70463 | 11/2000 |

OTHER PUBLICATIONS

Crosbie et al, "Defending a Computer Using Autonomous Agents", National Information Systems Security Conference, XX, XX, Oct. 1995, pp. 549-558, XP001059892.
Balasubramaniyan et al, "An Architectur for Intrusion Detection Using Autonomous Agents", Coast Laboratory, Purdue University, West Lafayette, IN 47907-1398.

(Continued)

*Primary Examiner*—Gilberto Barron
*Assistant Examiner*—Samson Lemma
(74) *Attorney, Agent, or Firm*—Nixon & Vanderhye P.C.

(57) ABSTRACT

A computer security system uses a plurality of co-operating software agents to protect a network against attack. Individual agents at each node the network co-operatively act to detect attacks and to share attack signatures and solutions via a message exchange mechanism. A global internal measurement of the overall health of the group of agents may be used as an indicator of a possible attack. In larger networks, the agents may be formed a plurality of separate autonomous groups, with a common group identity being automatically maintained by the message passing mechanism. Individual groups may be located by a system designer in separate cells or domains within the network, so that if one cell becomes compromised the rest of the network is not affected.

50 Claims, 2 Drawing Sheets

OTHER PUBLICATIONS

Carver, Jr. et al, "A Methodology for Using Intelligent Agents to provide Automated Intrusion Response", Proceedings of the 2000 IEEE, Workshop on Information Assurance and Security, United States Military Academy, West Point, NY, Jun. 6-7, 2000.

Helmer et al, "Intelligent Agents for Intrusion Detection", Iowa State University, Ames, Iowa 50011.

He et al, "A Solution to Open Standard of PKI", Feb. 11, 1998.

Asaka et al, "A Method of Tracing Intruders by Use of Mobile Agents".

Hofmeyr et al, "Immunity by Design: An Artificial Immune System".

Carver, Jr. et al, "Adaptation Techniques for Intrusion Detection and Intrusion Response Systems".

Carver, Jr. et al, A Methodolgy for.

Crosbie et al, "Defending a Computer System Using Autonomous Agents", National Information Systems Security Conference, Oct. 1995, pp. 549-558.

* cited by examiner

AGENT-BASED INTRUSION DETECTION SYSTEM

This application is the US national phase of international application PCT/GB02/04107 filed 10 Sep. 2002 which designated the U.S. and claims benefit of EP's 010308337.3, 01308325.8, 01308321.7 and 01308322.5, dated Sep. 28, 2001, respectively, the entire content of each of which is hereby incorporated by reference.

BACKGROUND

1. Technical Field

The present invention relates to an intrusion detection system (IDS) for use within a computer network, and particularly to such a system that makes use of co-operative software agents.

2. Related Art

The advent in recent years of a number of increasingly powerful macro viruses, some of which have port-scanning capabilities, has demonstrated the inadequacies of most current static and manually-controlled security mechanisms for protecting computer systems. As viral and other attacks become increasingly common, and increasingly sophisticated, traditional systems are unlikely to be able to cope. Such systems are insufficiently flexible, scalable or reactive to be able to deal effectively with new and potentially unknown security threats.

BRIEF SUMMARY

In an effort to tackle these problems, a number of authors have proposed constructing an intrusion detection system from a collection of co-operating software agents to provide distributed monitoring and detection. In one such system, proposed by Crosbie and Spafford, a distributed set of agents monitors network traffic and machine activity, including CPU utilisation. Their system also has agents exchanging anomaly reports between each other, with decisions to raise an intrusion alert being based on combined evidence from a number of agents. They utilise a form of machine learning based on evolving genetic programs in order to recognise new patterns of attack. See: Crosbie M. and Spafford E. "*Defending a Computer System using Autonomous Agents*", In 18th *National Information Systems Security Conference*, October 1995.

Similar work by Carver et al focuses on the dynamic and adaptive response to varying levels of security threat using a distributed heterogeneous group of agents: Carver C. A., Hill J. M, Surdu J. R., and Pooch U. W., "*A Methodology for using Intelligent Agents to provide Automated Intrusion Response,*" *IEEE Systems, Man and Cybernetics Information Assurance and Security Workshop*, West Point, N.Y., Jun. 6-7, 2000, pp. 110-116.

Work by Helmer et al demonstrates a multi-agent network defence system in which software agents monitor low-level network activity and report it to higher-level software agents for analysis: see Helmer G. G., Wong J. S., Honavar V., and Miller L. "*Intelligent agents for intrusion detection*". In *Proceedings, IEEE Information Technology Conference*, pages 121-124, Syracuse, N.Y., September 1998.

Details of a specific architecture for an agent-based intrusion detection system is described in Balasubramaniyan J., Jose Omar Garcia-Fernandez, Spafford E., and Zamboni D. "*An Architecture for Intrusion Detection using Autonomous Agents*". Department of Computer Sciences, Purdue University; Coast TR 98-05; 1998.

Work by Qi He and Sycara, although in the rather different field of PKI certificate management, discusses the use of encrypted KQML message exchange amongst a networked group of agents: see Qi He and Sycara K. P. and Zhongmin Su, "*A Solution to Open Standard of PKI*", book, *Australisian Conference on Information Security and Privacy*, pages 99-110, 1998.

The use of security agents to provide authorisations within a distributed environment is disclosed in *Vijay Varadharajan, Nikhir Kumar and Yi Mu, Security Agent Based Distributed Authorization: An Approach. National Information Security Systems Conference*, 21st *NISSC Proceedings: Papers* Oct. 6-9, 1998: Hyatt Regency—Crystal City, Va.

The use of mobile agents to trace intruders is disclosed in Midori Asaka, Shunji Okazawa and Atsushi Taguchi, "*A Method of Tracing Intruders by Use of Mobile Agent*", in *Proceedings of the 9*[th] *Annual Internetworking Conference (INET '99)*, San Jose, Calif. June 1999.

Finally, a certain amount of research has been carried out into the use of immune system based models of security: see for example Hofmeyr S., & Forrest S. "*Immunity by Design: An Artificial Immune System*" *Proceedings of the Genetic and Evolutionary Computation Conference (GECCO)*, Morgan-Kaufmann, San Francisco, Calif., pp. 1289-1296 (1999); and also Kephart J. O., "*A Biologically Inspired Immune System for Computers*", *Artificial Life IV, Proceedings of the Fourth International Workshop on Synthesis and Simulation of Living Systems*, Robney A. Brooks and Pattie Maes, eds., MIT Press, Cambridge, Mass. 1994, pp. 130-139.

According to a first aspect of the present invention there is provided a computer security system comprising a plurality of inter-communicating software agents together forming an agent group, the system maintaining and tracking a groupwide measure of agent status or behaviour, comparing actual behaviour patterns of the measure with known normal behaviour patterns and determining that a security threat does or may exist when the actual behaviour patterns diverge from normal behaviour patterns.

According to a second aspect, there is provided a computer security system comprising a plurality of inter-communicating software agents which co-operatively determine when a security threat does or may exist, the agents communicating by a message-exchange system in which, as messages pass between a first agent and a second agent, the ability of the first agent to recognise the second as friendly increases.

According to a third aspect there is provided a computer security system comprising a plurality of inter-communicating software agents together forming an agent group, the agents communicating by a message-exchange system in which, when one agent determines that a security threat does or may exist, that agent sends a warning message, including an anomaly pattern indicative of the threat, to other agents in the group.

According to a fourth aspect there is provided a computer security system comprising a plurality of inter-communicating software agents which co-operatively determine when a threat does or may exist, the agents being divided up into a plurality of agent groups, each agent corresponding with other agents in its respective group, but not agents in other groups, by a message-exchange system including the exchange of group-specific tags.

In addition to a computer security system, the present invention further extends to a computer network including such a computer security system, a method of operating a network and/or a computer security system, and a computer program embodying any such system or method.

Current IDS systems rely on specific network or machine checkpoints to indicate the existence of an attack or a threat. This requires a separate specific sensing capability for every possible point of attack. While the system of the present invention, in at least some embodiments, also monitors a number of known entry checkpoints to the network, it may also monitor a set of internal (that is, internal to the agent) and network state variables such as CPU load, traffic rates and service levels in order to calculate the current metabolic rate of the system and of each agent. Instead of calculating the metabolic rate, the system could calculate any other convenient internal groupwide measure of agent status and/or behaviour. This may come either from the status or behaviour of separate agents and/or from status indicators or behaviour within a virtual private network on which the agents exist. In one convenient embodiment, the system may monitor the quantity or frequency of message flows within that virtual private network. The invention, in its various embodiments, can therefore generate warnings, and preferably also take action, in response to novel and previously unknown intrusions. Where the agents reside on a virtual private network, the system may respond to intrusions both within that virtual private network (for example corruption of the agents) and/or intrusions on the network which the agents are protecting.

The tag exchange scheme of the preferred embodiment is independent of any specific learning mechanism the agents may use, allowing different adaptive strategies and processes to be implemented within that framework.

The messaging overhead can be very low, as each antibody tag in the preferred embodiment is only a short sequence of bytes (typically less than 500 bytes).

The preferred mechanism is very robust, in that if individual agents are damaged, the rest of the group may continue functioning.

The preferred system is self-organising and in practical embodiments a distributed directory service may be used so that agents can locate other active agents and easily connect to them.

By specifying new tag-identifying elements, an administrator may select for a number of sub-groups or cells to form within a network. This increases the robustness and the security of the system, as each group may be self-maintaining.

A specific application domain for the preferred embodiment is in the defence of peer to peer (P2P) networks. The preferred antibody exchange and agent processes easily operate over such P2P networks, and allow a high degree of security for both data and services.

BRIEF DESCRIPTION OF THE DRAWINGS

The invention may be carried into practice in a number of ways and one specific embodiment will now be described, by way of example, with reference to the accompanying drawings, in which.

DETAILED DESCRIPTION OF EXEMPLARY EMBODIMENTS

Figure 1:
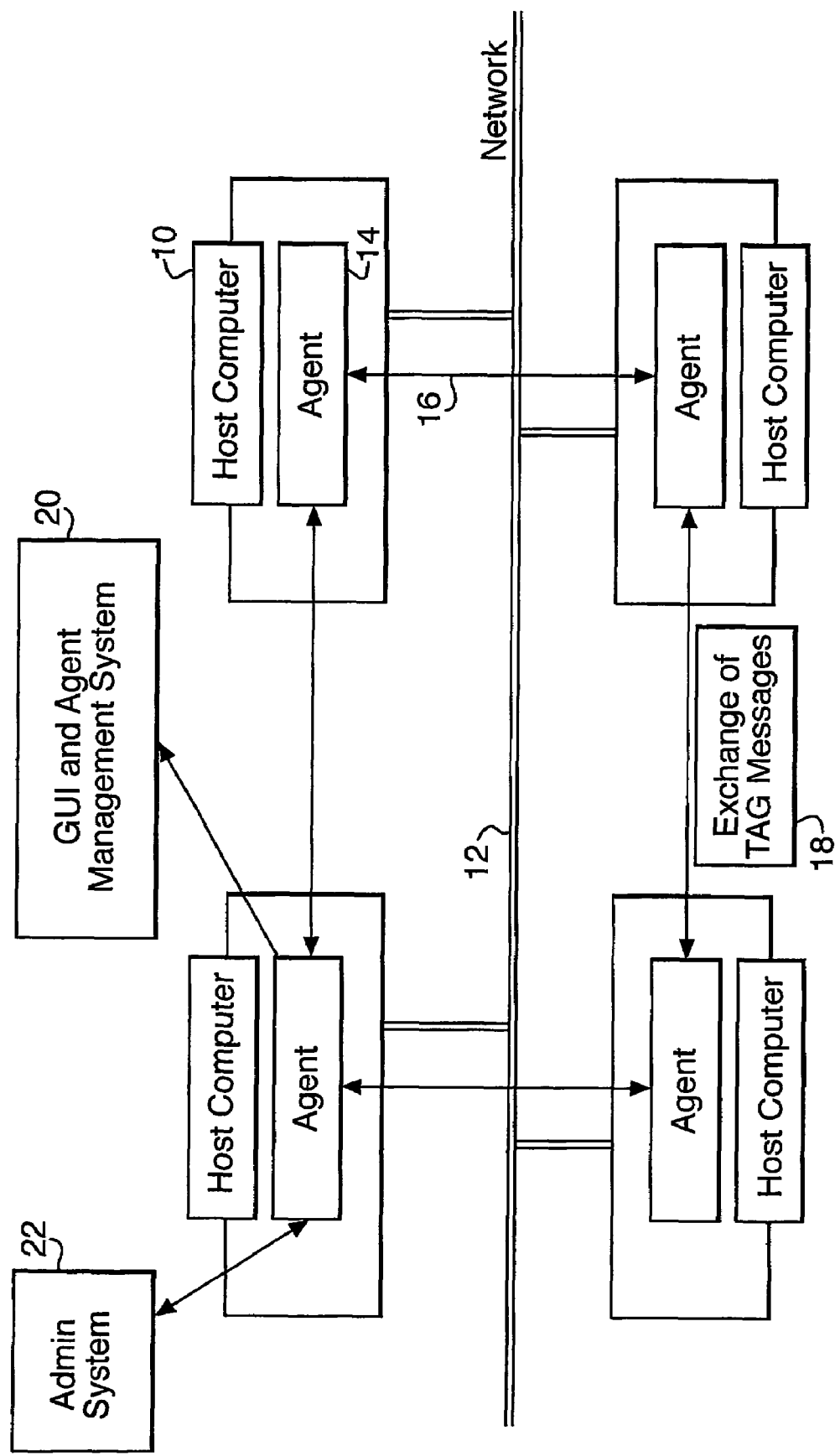
FIG. 1 is a schematic view of a preferred implementation.

A schematic view of a practical embodiment of the invention is shown in FIG. 1. The system is designed to protect a number of host computers 10 which are linked together by a network 12. This is achieved by a population of distributed software agents 14, residing on the host computers, and acting as smart monitors of hostile behaviours, attacks or intrusions on the network.

The agents communicate with each other by exchanging tag messages 18 (to be described in more detail below) which served not only to allow information exchange but also to enable agents to identify one another. Agent to agent communication takes place not via the normal network channels but across a virtual private network 16. Since virus and other security threats will not normally have access to the virtual private network (which is protected by encryption), the agents can monitor viral and other activity on the public network communication channels without themselves being compromised. The virtual private network 16 provides a multi-agent platform, capable of secure inter-agent communication, secure database access methods, and web browser administrative control.

Typically, agents are static, with one agent 14 running on each host computer 10. However, more complex arrangements are envisaged, for example the possibility of having more than one agent per host computer or network device. In some embodiments, agents may be mobile, and able to move from node to node across the network.

The preferred implementation includes a GUI and agent management system 20, incorporating a variety of agent management tools. These tools are preferably centrally operated within the network, but are initiated via a web browser interface from any authorised server, so preserving the fully distributed advantages of the agent IDS.

Each agent possesses a number of different sensors which enable it to make a variety of local measurements, some of which may relate to the local state of the physical network 12 and some of which to the local state of the agent itself or to the virtual private network 16. Individual agents may have sensors for such things as local CPU utilisation, local network traffic rates, local memory usage, agent's internal state (e.g. the "health" of the agent), level of trade with other agents, agent's success rate at communicating with other agents, email activity, write and read operations, memory addresses and so on. The overall purpose of the sensors is to allow agents to detect, either individually or in combination with other agents, anomalous behaviour on the network, such as for example that which might be symptomatic of a virus attack, a worm attack, or a denial of service attack.

If an individual agent detects a pattern of anomalous activity, it reports that fact to other agents across the virtual private network, and also (either on the virtual private network or on a public channel) to an admin system or system controller 22. Here, a human operator may review the alert and decide what action if any needs to be taken.

Some patterns of anomalous activity may not easily be detectable by a single agent, and the present embodiment includes the facility for making macro-scale measurements across the agents, or across the virtual private network, and using those to trigger alerts or to cause defensive action to be taken. In the preferred embodiment (as will be described in more detail below) each agent has a "metabolic rate" which can be considered representative of the agent's "health" or "energy level". One or more user-nominated agents across the network records and measures variations in the average or collective metabolic rate of the entire agent population. Those nominated agents then compare the measured metabolic rate over a specific time interval to previously recorded patterns known to represent healthy network states. Variations from these previous "healthy" metabolic patterns may then raise an alert, to be forwarded to the admin system 22.

Alternative macro-scale sensors may be used to trigger alerts, or defensive action, based on a variety of agent-related variables. For example, the user-nominated agents may monitor the frequency of inter-agent messages to detect variations in this traffic. Such variations can be utilised as an indication of attacks on other agents (that is, as an indication that the virtual private network may have been compromised), or of possible attacks on the network resources of the agents' host machines 10.

The admin system 22 may be automatically notified when the average or collective metabolic rate, or other macro-scale measurement, exceeds a threshold value. Alternatively, in more sophisticated embodiments, the system may include automated machine learning algorithms such as neural networks or genetic algorithms which learn and infer patterns of attack from changes in the metabolic rate or other measurement.

In order to reduce the number of false positives being generated by the system (that is, incorrectly identified intrusions), the system incorporates a group-voting scheme within the agent group, so that for example more than one agent must raise an intrusion event alert before the admin system 22 is notified.

Each agent stores in its own local memory an internal list of byte sequences which represent known or suspected anomaly patterns based upon the outputs of the various sensors that the agent has access to and/or to the macro-measurements being taken across the entire agent population. These "anomaly patterns" might, for example, be representative of the type of activity that is known to be indicative of viral or worm infections, firewall probes, or other known threat processes. The patterns may include, but are obviously not limited to, traditional virus/worm signature strings.

As the agent makes measurements with its own local sensors and/or receives input across the virtual private network of macro-measurements, it constructs corresponding byte sequences which it dynamically attempts to match against its own internal list. If a match is found, the agent may apply any predefined defence strategy to proactively remove or deal with the threat. At the same time, the agent transmits the new anomaly pattern/signature to other agents by means of a tag message 18. This rapidly distributes knowledge of the potential threat throughout the community of agents.

In a similar manner, any agent that knows how to deal with a particular threat, as indicated by a specific anomaly pattern, may transmit that information to (ie inoculate) other agents. This could be in the form of either data (e.g. the URL from which an agent can automatically download anti-viral software) or alternatively the software itself.

Via the exchange of shared anomaly patterns, the agents create a group immune system which is far more resistant to attack than a collection of isolated detection systems or a centralised monitoring and detection system. In addition, as each agent may apply code or software processes itself in order to deal with or remove a detected attack, the network as a whole may be defended with much greater speed of response than either a manually updated anti-virus product or a centralised IDS.

For example, with the present embodiment, an agent may be able to take immediate action to secure or to defend the network as soon as it becomes aware of an attack, even before a human operator has had a chance to take action.

One approach, for example, would be for an agent automatically to isolate its host machine 10 from the network 12, and then to inform the user of the machine 10 that such an action had been taken due to hostile virus or worm activity.

As previously mentioned, inter-agent trading takes place by exchange of tag messages 18. In addition to being a simple mechanism for exchange of information between agents, the message transfers are designed to enhance the process of cohesion and agent identification within the agent group. Via the dynamic interchange of encrypted tags, the agents are able to distinguish between authorised and unauthorised agents.

In the arrangement shown in FIG. 1, the agents are members of a single group, and are all capable of talking to each other. In a more complex network, however, there may be multiple groups of agents, with the agents of one group being able to communicate between themselves but not with the agents of a second group. By maintaining the internal cohesion of each group, the groups become better able to distinguish between "self" and "non-self", and therefore better able to identify messages from spurious non-friendly agents which might have infiltrated the virtual private network 16.

This approach enables a human administrator, if so desired, to sub-divide a large intranet domain into multiple sub-domains, each hosting a separate cohesive group of agents. Each agent sub-group then interacts only with its local group, as the neighbouring groups (or "cells") would be culturally separate due to their unique set of encrypted identifying tags. Hence, even if an attack succeeds in penetrating one of the agent's communities and subverts the agent in that group, it would still have to penetrate the remaining cells individually. In addition, if one cell is infected the neighbouring cells will be alerted by changes in the behaviour of that cell.

Overall system knowledge of a potential threat may then come either from each cell separately, or from grouping information from several individual cells (eg by grouping the cell-based macro information on the health, notional metabolic rate or other internal status indicator of the agents within each cell).

In a practical embodiment, separation into individual cells can be achieved by installing a software agent at every node in the network, which can communicate over secure channels with other agents in the local group (as shown in FIG. 1). Each node broadcasts hashed encoded objects or tag messages 18, which all other agents listen to. Messages intended for members of another group will not be understandable by a recipient agent, and are simply ignored.

The precise implementation of the inter-agent trading processes may be left to the designer of a specific system since the current invention, in its variety of forms, could make use of quite a large number of different approaches. It is preferred, however, that the trading system tends to enhance the cohesiveness of agents within a particular group and, over time, to cause all of the agents within a group to converge or to become more similar in some way.

That is achieved, in the preferred embodiment, by providing each agent with its own identify string, held in local memory. These identify strings may be exchanged within the message tags 18 between two agents who are sufficiently similar to allow trades to take place. When a trade occurs, each agent is allowed to replace one portion of its trading partner's identify string with the corresponding portion of its own string. As a result, over time, the identify strings of agents trading within a single social group tend to become more similar. Agents trading within a different social group will, over time, tend to converge on a different identify string, thereby enhancing not only the cohesiveness of each individual group but also the distinctiveness between groups.

Each agent is in the preferred embodiment initialised with a quantity of virtual energy (which we may call "spice"). During each trading activity, an initiating agent transfers a given amount of spice to its trading partner. Spice is available only from other agents, and is required for agent survival. Hence, any agent with whom no agent wishes to trade will eventually die.

One of the possible intrinsic measurements that may be made on an individual agent is its "health" or "metabolic rate". Taken across the group of agents, the metabolic rate may provide one of the macro-scale measurements that the system may use to detect anomalous behaviour. In one embodiment, the agent population is dynamic, with new agents being created and automatically deleted once they have reached the end of their life. In such an embodiment, each agent stores locally a value representing its "metabolic rate" (or alternatively its life expectancy). Whenever an agent detects or receives a pattern representative of some anomalous activity it first tries to pattern match to see whether that pattern can be identified from its own internally stored list of known anomalous patterns/signatures. If it is able to match the pattern, it forwards details of the pattern and any solution to other agents in the group. However, if it is unable to match the unknown anomalous pattern (even after running appropriate local software including mutating algorithms applied to the anomalous pattern to enhance the possibility of a match) the metabolic rate of the agent is increased or, equivalently, its life expectancy is decreased. In that way, agents that are effective at identifying and dealing with new threats have an evolutionary advantage and, in time, come to dominate within the agent community.

In some practical implementations, particularly where it is desired to have a single agent continuously protecting each node within a computer network, it may be undesirable to have a dynamically varying population of agents. In such an embodiment, the agents may expend energy units by exchanging them for physical resources on their host machine. For example, a host computer might charge an agent a number of energy units for a fixed number of cycles of CPU time being used by the agent. In such an arrangement, the number of energy units held by agents within the community can be used as the macro-scale measurement of the overall "health" of the system. Such an arrangement also provides a means of resource control on the agents: it is of course desirable that any anomaly detection system should not impose excessive loading on the host machine resources.

More generally, whether the number of agents is variable or fixed, the system can use any convenient macro-scale measurement, across the agents, which in some way represents the agents' health. Thus, any convenient measure could be used which allows a distinction to be made between "healthy" agents and "unhealthy" agents. The former will be those which have not previously faced attack, or which have successfully beaten off attacks; while the latter are those which are either currently under attack or which have been weakened by previous attacks.

In an embodiment in which the agents can specialise in particular aspects of system security, for example virus detection, an evolution mechanism may be incorporated. This allows agents to generate new agents via genetic recombination, these new agents then being selected against specific security requirements.

A specific application for the described embodiment is in defending peer to peer (P2P) networks. P2P networks are currently difficult to secure using existing network security models as they bypass traditional firewall mechanisms, and they may span multiple corporate networks. The embodiment described operates easily over such P2P networks, enabling a higher degree of security for any data or services.

Simulation:

The specific description will be concluded with a brief description of a simulation of a system operating according to the principles set out above. It should be understood that the subsequent description relates to a computer simulation rather than an actual physical implementation of the invention. Some of the detailed mechanisms described (for example use of the "Sugarscape" model) were chosen for purposes of convenient simulation and do not necessarily represent the best or most efficient method for implementing such a system in a real-world environment.

1. Experiments

The multi-agent simulation was developed based on the REPAST agent toolkit from the University of Chicago. This package was selected in preference to alternative social agent platforms e.g. Swarm Burkhart B., Burkhart R., "*The Swarm Multi-Agent Simulation System*" (*OOPSLA*) '94 *Workshop on "The Object Engine*" 7 Sep. 1994, as it offers a fast pure Java implementation with extensive support for visualisation, offline batch running and object management.

We first constructed a two-dimensional discrete spatial world model in which a population of artificial agents could interact and move, based on the Sugarscape model Epstein J., Axtell R., "*Growing Artificial Societies: Social Science from the Bottom Up*", MIT Press, 1996. This model was selected as it represents a suitable test case environment for investigating complex multi-agent simulations. In addition we wished to enable easy reproduction of the presented results.

2. Model Description

The model is based on a population of agents, which are initialised randomly with the following set of variables:

i) Vision—an agent can sense other agents and food objects within a specified radius from its own co-ordinates. Assigned randomly within a specified range e.g. 1-5 steps.

ii) Metabolism—agents have an integer counter which represents their rate of energy consumption. Assigned randomly in a specified range. Can be increased if an agent is infected with a pathogen.

iii) Lifespan—agents are initialised with a fixed lifespan, randomly assigned, typically between 20-200 time steps.

iv) Sugar—agents require sugar to survive, which is an environmental resource. Sugar is distributed as in FIG. 1, and re-grows once consumed by an agent at some specified rate. The agent's normal behaviour is to look around their local environment using a von Neuman neighbourhood and to move to the site with the highest sugar level. This naturally leads to the aggregation of agents in this particular landscape. Agents consume sugar by decrementing the value proportional to their metabolic rate.

v) Spice—as described in the Epstein & Axtell model, a second commodity was introduced into the world which is only available from other agents, and is required for agent survival. Agents can only acquire spice when they engage in a trade interaction with another agent. The rules of trade are described in the following section.

vi) Memory array—list of M most frequently used trading agents.

vii) Immune system—agents have a string of N characters, which represents a simplified immune system.
viii) Pathogens—agents may be initialised with a vector (dynamic Java array) of viral infections, composed of short random character strings.

3. Memes and Tags

The model differs from the classic Sugarscape in the following ways:

Agent Classes—there are nine separate social classes defined in the present model, based on an array of identifying cultural tags, (the classic model typically only uses two agent classes, Epstein and Axtell 96). The cultural tags are represented by an array of integer values between 0-9. The specific tags used by the agents were:

Tag 1 is a group identifier, i.e. this tag defined the class to which an agent belongs.
Tag 2 defines how much spice an agent will share during trade.
Tag 3 has no direct role but is used to help measure cultural variance, during agent trade interactions.

The visual interface colour codes agents according to the value of tag 1.

Cultural Variance—we measure variance between the agents by the summed difference between the tag values. In contrast the Sugarscape model uses binary tags and a Hamming distance measurement of cultural or social variance. An integer representation was selected as this maps into the large number of agent classes being operated on.

4. Dynamic Group Formation

The first experiments were designed to study under what conditions socially co-operative groups of agents would spontaneously develop, using the defined model.

5. Rules for Trading Interactions

Each agent applied the following algorithm during its allocated time slot.

Look in all neighbouring (von Neuman) cells to radius=vision parameter. If cell occupied then
  If agent is of similar class type then
    trade with agent in the cell
    and randomly flip one tag of agent to match own tag.
    Else ignore agent
  Else if cell unoccupied record amount of sugar present.
Move to selected unoccupied cell with highest sugar level.

An agent receives an amount of spice equal to the second tag value T of the agent it is trading with plus an amount specified by a gain factor G, representing the profit surplus, while the second agent loses an amount equal to T. The gain factor G was found to be a key parameter in enabling the formation of stable social groups. In addition, rate of group formation and lifespan of the resulting group was proportional to the value of G. For example in FIG. 2 a gain value of G=10 results in very rapid group formation, i.e. within 20 time steps. This result suggests that one element of group formation is an asymmetric gain function in any trading process, which underlies the need of the agents to co-operate. This appears intuitive, as a social group is itself an out of equilibrium structure.

6. Social Network Structures

Figure 2:
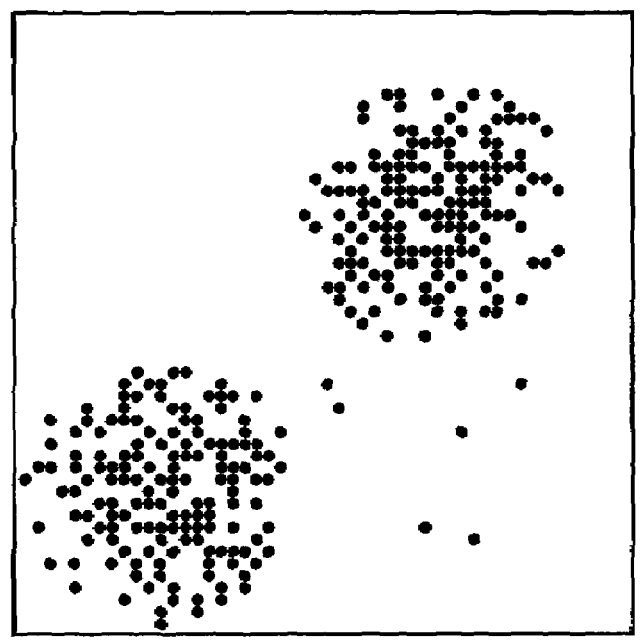
FIG. 2 is an image of the agent spatial environment, in a simulation.
Figure 3:
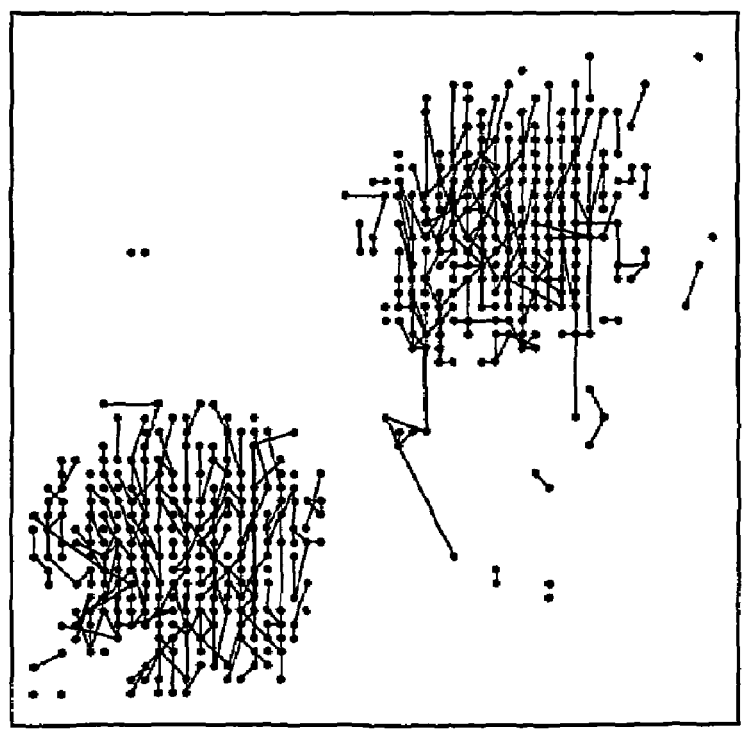
FIG. 3 shows the social network connections between the ten most frequent trading partners encountered by each agent in the simulation.

In order to visualise what social relationships exist over time between the agents we generated network graphs showing the connections between each agent and all of the agents currently in its memory array. FIG. 2 is a schematic view of the agent spatial environment, showing the development of two distinct social groups within a 50×50 model grid. FIG. 3 shows the connections between each agent and all of the agents currently referenced within their memory array. This social memory array of each agent contains a reference to the ten most frequent trading partners the agent has so far met. In FIG. 3, with no disease vectors the network displays high connectivity and is highly stable once formed, i.e. it persists for a period several times longer than the lifespan of an individual agent.

7. Immune System Development

The second stage of the work involved adding an artificial immune model to the agents, based on work by Epstein and Axtell (Epstein and Axtell 1996, op cit). During each trade interaction between two agents, the initiating agent is passed a vector of N disease strings. Each string is a short sequence of characters, which the receiving agent then attempts to find a match for from its internal immune system, (an large array of character strings). Each string which the agents fails to match results in an increment to its metabolic rate. This results in a gradual degradation of an agent's ability to survive and a reduction in its lifespan. The agents can also undergo random mutation of elements in their immune system, in order to generate potentially novel "anti-body" solutions to current diseases in the population.

Agents have the capability of exchanging a copy of the antibodies they have acquired with each agent that they trade with. The impact of allowing this co-operative inter-agent exchange to occur is considerable: the average number of social connections in the population was found to increase by more than a factor of two, indicating a significant increase in the agents' state of health. This is also reflected in greater stability and lifespan of their social groups.

8. Analysis

From the above results we extracted the following conclusions:

i) Through a virtual commercial trade process we created stable self-organising groups of agents, via inter-agent meme transfer.
ii) The groups demonstrated resilience to invasion and competition by competing groups.
iii) The groups displayed a collective immunity mechanism, allowing them to withstand frequent infection from external or internal agents.

The metabolic conversions of such a cluster/group contribute to defining its sense of self, (i.e. ability to recognise self-elements). Hence abnormal perturbations of the metabolic rate is one method for agents to detect when attacks or intrusions are in progress.

What is claimed is:

1. A computer security system comprising:
  a plurality of inter-communicating computers including software agents together forming a plurality of agent groups, each agent corresponding with other agents in its respective group but not with agents in other groups via a message-exchange system including the exchange of group specific tags;
  means for maintaining and tracking groupwide measures of agent status or behavior; and
  means for comparing actual behavior patterns of the measure for a given group with known normal behavior patterns and determining that a security threat does or may exist when the actual behavior patterns diverge from normal behavior patterns.

2. A computer security system as in claim 1 in which the measure for each group is a value indicative of a collective variable for that group, or an average value for the agents within that group.

3. A computer security system as in claim 2 in which the system determines that a security threat does or may exist if the value for a group moves outside a range of normal values.

4. A computer security system as in claim 2 in which the value for each group is indicative of a notional metabolic rate of the agents within that respective group.

5. A computer security system as in claim 2 in which the value for each group is indicative of a notional life expectancy of the agents within that group.

6. A computer security system as in claim 2 in which the value for each group is indicative of a notional energy level of agents within that group.

7. A computer security system as in claim 2 in which the value for each group is indicative of inter-agent communication traffic.

8. A computer security system as in claim 2 in which the value for each group is indicative of agents' success in attempting to communicate with other agents within that group.

9. A computer security system as in claim 2 in which the value for each group is indicative of a combination of at least two of: notional metabolic rate, notional life expectancy, notional energy level, inter-agent communication traffic and success in attempting to communicate with other agents.

10. A computer security system as in claim 1 in which the agents reside on a virtual private network and communicate on a separate channel from that used by devices on a computer network being protected by the security system.

11. A computer security system as in claim 10 in which each agent includes respective sensors, or is arranged to receive information for external sensors, which provide it with network measures indicative of a network being protected.

12. A computer security system as in claim 11 in which the network measures include measures of at least one of: memory utilization, network traffic, network writes, network reads, port probes, memory addresses, email activity or any combination thereof.

13. A computer security system as in claim 10 in which the system determines that a security threat does or may exist in dependence upon a combination of the network measures and the actual behavior patterns of a groupwise measure.

14. A computer security system as in claim 1 in which each agent, individually, attempts to detect anomalous behavior.

15. A computer security system as in claim 14 in which detected anomalous behavior is converted into an anomaly pattern which an agent attempts to match against a local record of known anomaly patterns.

16. A computer security system comprising:
a plurality of inter-communicating computers including software agents together forming an agent group;
means for maintaining and tracking a groupwide measure of agent status or behavior;
means for comparing actual behavior patterns of the measure with known normal behavior patterns; and
means for determining that a security threat does or may exist when the actual behavior patterns diverge from normal behavior patterns;
wherein each agent, individually, attempts to detect anomalous behavior;
wherein detected anomalous behavior is converted into an anomaly pattern which the agent attempts to match against a local record of known anomaly patterns;
wherein the value is indicative of a notional metabolic rate of the agents within the group; and
wherein, if the match fails and the agent cannot recognize the anomaly pattern its metabolic rate is increased, or its life expectancy or notional energy is decreased.

17. A computer security system as in claim 14 in which an agent mutates the anomaly pattern, or the known anomaly patterns in its local record, as part of its attempts to match.

18. A computer security system as in claim 1 in which the total number of agents within a group is dynamic, with agents dying and new agents automatically being created.

19. A computer security system as in claim 1 in which the total number of agents within a group is fixed.

20. A computer security system as in claim 19 in which there is exactly one agent per node of a computer network being protected by the system.

21. A computer security system as in claim 6, in which each agent expends notional energy according to local computer resources it uses to perform its functions.

22. A computer security system as in claim 6, in which during communication between agents, a quantity of notional energy is transferred from a transmitting agent to a receiving agent.

23. A computer security system as in claim 1 including a system controller connected to be notified that a security threat does or may exist only when a given plurality of agents within a group determines that the threat does or may exist.

24. A computer security system comprising:
a plurality of inter-communicating computers having software agents together forming a plurality of agent groups, each agent corresponding with other agents in its respective group but not with agents in other groups via a message-exchange system including the exchange of group specific tags;
each agent including means for comparing an actual behavior pattern of its respective group with stored expected behavior patterns and co-operatively determining when a security threat does or may exist, the agents communicating by a message-exchange system in which, as messages pass between a first agent and a second agent, the ability of the first agent to recognize the second as friendly increases.

25. A computer security system comprising:
a plurality of inter-communicating computers having software agents together forming a plurality of agent groups, each agent corresponding with other agents in its respective group but not with agents in other groups via a message-exchange system including the exchange of group specific tags;
the agents each including means for comparing an actual behavior pattern of its respective group with stored expected behavior patterns and for communicating by a message-exchange system in which, when one agent determines that a security threat does or may exist, that agent sends a warning message, including an anomaly pattern indicative of the threat, to other agents in its group.

26. A method providing computer security among a plurality of inter-communicating computers having associated software agents, said method comprising:
dividing a plurality of said agents into plural groups, each agent corresponding with other agents in its respective group but not with agents in other groups, a message-exchange system including the exchange of group specific tags;

maintaining and tracking groupwide measures of agent status or behavior comparing actual behavior patterns of the measure for a given group with known normal behavior patterns; and determining that a security threat does or may exist when the actual behavior patterns diverge from normal behavior patterns.

27. A method as in claim 26 in which the measure for each group is a value indicative of a collective variable for that group, or an average value for the agents within that group.

28. A method as in claim 27 in which it is determined that that a security threat does or may exist if the value for a group moves outside a range of normal values.

29. A method as in claim 27 in which the value for each group is indicative of a notional metabolic rate of the agents within that respective group.

30. A method as in claim 27 in which the value for each group is indicative of a notional life expectancy of the agents within that group.

31. A method as in claim 27 in which the value for each group is indicative of a notional energy level of agents within that group.

32. A method as in claim 27 in which the value for each group is indicative of inter-agent communication traffic.

33. A method as in claim 27 in which the value for each group is indicative of agents' success in attempting to communicate with out agents with that group.

34. A method as in claim 27 in which the value for each group is indicative of a combination of at least two of: notional metabolic rate, notional life expectancy, notional energy level, inter-agent communication traffic and success in attempting to communicate with other agents.

35. A method as in claim 26 in which the agents reside on a virtual private network and communicate on a separate channel from that used by devices on a computer network being protected by the security system.

36. A method as in claim 35 in which each agent includes respective sensors, or is arranged to receive information for external sensors, which provide it with network measures indicative of a network being protected.

37. A method as in claim 36 in which the network measures include measures of at least one of: memory utilization, network traffic, network writes, network reads, port probes, memory addresses, email activity or any combination thereof.

38. A method as in claim 35 in which it is determined that a security threat does or may exist in dependence upon a combination of the network measures and the actual behavior patterns of a groupwise measure.

39. A method as in claim 26 in which each agent, individually, attempts to detect anomalous behavior.

40. A method as in claim 39 in which detected anomalous behavior is converted into an anomaly pattern which an agent attempts to match against a local record of known anomaly patterns.

41. A method providing computer security among a plurality of inter-communicating software agents together forming an agent group, said method comprising:

maintaining and tracking a groupwide measure of agent status or behavior;

comparing actual behavior patterns of the measure with known normal behavior patterns; and determining that a security threat does or may exist when the actual behavior patterns diverge from normal behavior patterns;

wherein each agent, individually, attempts to detect anomalous behavior;

wherein detected anomalous behavior is converted into an anomaly pattern which the agent attempts to match against a local record of known anomaly patterns; and wherein, if the match fails and the agent cannot recognize the anomaly pattern its metabolic rate is increased, or its life expectancy or notional energy is decreased.

42. A method as in claim 39 in which an agent mutates the anomaly pattern, or the known anomaly patterns in its local record, as part of its attempts to match.

43. A method as in claim 26 in which the total number of agents within a group is dynamic, with agents dying and new agents automatically being created.

44. A method as in claim 26 in which the total number of agents within a group is fixed.

45. A method as in claim 44 in which there is exactly one agent per node of a computer network being protected.

46. A method as in claim 31 in which each agent expends notional energy according to local computer resources it uses to perform its functions.

47. A method as in claim 31 in which during communication between agents, a quantity of notional energy is transferred from a transmitting agent to a receiving agent.

48. A method as in claim 26 including notifying a system controller that a security threat does or may exist only when a given plurality of agents within a group determines that the threat does or may exist.

49. A method providing a computer security for a plurality of inter-communicating software agents which together form a plurality of agent groups, each agent corresponding with other agents in its respective group but not with agents in other groups via a mess-exchange system including the exchange of group specific tags, said agents cooperating to perform said method comprising:

comparing at each agent actual behavior patterns of an agent's own group with stored expected behavior patterns; and determining at each agent when a security threat does or may exist based on said comparing step, the agents communicating by a message-exchange system in which, as messages pass between a first agent and second agent, the ability of the first agent to recognize the second as friendly increases.

50. A method comprising computer security for a plurality of inter-communicating software agents together forming a plurality of agent groups, each agent corresponding with other agents in its respective group but not with agents in other groups via a message-exchange system including the exchange of group specific tags, the agents cooperating to perform said method comprising:

comparing at each agent actual behavior patterns of an agent's own group with stored expected behavior patterns; and each agent communicating by a message-exchange system in which, when one agent determines that a security threat does or may exist, that agent sends a warning message, including an anomaly pattern indicative of the threat, to other agents in its group.

* * * * *